US007817211B2

(12) United States Patent
Yun et al.

(10) Patent No.: US 7,817,211 B2
(45) Date of Patent: Oct. 19, 2010

(54) APPARATUSES AND METHODS FOR RESOLVING CHANNEL INFORMATION INCONSISTENCIES

(75) Inventors: Chang Sik Yun, Gyeonggi-do (KR); Bong Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1168 days.

(21) Appl. No.: 11/449,028

(22) Filed: Jun. 8, 2006

(65) Prior Publication Data

US 2006/0279659 A1  Dec. 14, 2006

(30) Foreign Application Priority Data

Jun. 8, 2005 (KR) .................... 10-2005-0048872

(51) Int. Cl.
*H04N 5/50* (2006.01)
(52) U.S. Cl. .................................... 348/731
(58) Field of Classification Search ................ 348/725, 348/731–732, 468, 461, 473, 726, 553–554; 725/68, 48, 37–38, 100, 120, 131, 151
See application file for complete search history.

(56) References Cited

U.S. PATENT DOCUMENTS

| | | | | | |
|---|---|---|---|---|---|
| 5,600,378 | A | * | 2/1997 | Wasilewski | 348/468 |
| 5,943,605 | A | * | 8/1999 | Koepele, Jr. | 725/114 |
| 6,040,850 | A | * | 3/2000 | Un et al. | 725/68 |
| 6,480,551 | B1 | * | 11/2002 | Ohishi et al. | 375/260 |
| 6,483,547 | B1 | * | 11/2002 | Eyer | 348/473 |
| 6,691,311 | B1 | * | 2/2004 | Yata et al. | 725/68 |
| 7,265,797 | B2 | * | 9/2007 | Bae | 348/732 |
| 7,626,960 | B2 | * | 12/2009 | Muller | 370/328 |
| 2004/0017831 | A1 | * | 1/2004 | Shen et al. | 370/486 |
| 2005/0188410 | A1 | * | 8/2005 | Kahn et al. | 725/100 |

OTHER PUBLICATIONS

Hartwig S: "Softwarearchitekturen Fuer Interaktive Digitale Decoder", FKT Fernseh Und Kinotechnik, Fachverlag Schiele & Schon GMBH., Berlin, DE, vol. 50, No. 3, 1996, pp. 92-94, 96, XP000581418 ISSN: 1430-9947.
"Service Information Delivered Out of Band for Digital Cable Television," ANSI/SCTE 65 2002, Document Soc. of Cable Telecommunications Engineers, XX, XX, (2002), pp. 1-125, XP002295148.
"Service Information for Digital Broadcasting In Cable Television Systems; J.94 (1998) Amendment 1 (10/00); Service Information Delivered Out of Band for Digital Cable Television Systems", ITU-T Standard in Force (I), Int'l Telecommunication Union, Geneva, CH, No. J.94 (1998) Amendment (2002), XP017401920.
"Service Information for Satellite Distribution of Digital Television for Cable and MMDS, ANSI/SCTE 57 2003", Document Soc. of Cable Telecommunications Engineers, XX, XX (2003), pp. 1-119, XP002295149.

* cited by examiner

*Primary Examiner*—Paulos M Natnael
(74) *Attorney, Agent, or Firm*—McKenna Long & Aldridge LLP (57) ABSTRACT

A host includes a controller configured to receive service information (SI) and retrieve defined channel map (DCM) information and virtual channel map (VCM) information from the SI information. The controller further configured to resolve inconsistencies between the DCM information and the VCM information, and create a resulting channel map that reflects the resolution of the inconsistencies between the DCM information and the VCM information.

16 Claims, 6 Drawing Sheets

FIG. 1

| | Bits | Bytes | |
|---|---|---|---|
| shortform_virtual_channel_table_section(){ | | | |
|     table_ID | 8 | 1 | uimsbf value 0xC4 |
|     zero | 2 | 2 | bslbf |
|     reserved | 2 | | bslbf |
|     section_length | 12 | | uimsbf |
|     zero | 3 | 1 | bslbf |
|     protocol_version | 5 | | see Sec. 4.4.1 |
|     transmission_medium | 4 | 1 | uimsbf |
|     table_subtype | 4 | | uimsbf see Table 5.14 |
|     VCT_ID | 16 | 2 | uimsbf |
|     if(table_subtype==DCM){ | | | |
|         DCM_structure() | * | (*) | |
|     } | | | |
|     if(table_subtype==VCM){ | | | |
|         VCM_structure() | * | (*) | |
|     } | | | |
|     if(table_subtype==ICM){ | | | |
|         ICM_structure() | * | (*) | |
|     } | | | |
|     for(i=0;i<N;i++){ | | | optional |
|         descriptor() | * | (*) | |
|     } | | | |
|     CRC_32 | 32 | 4 | rpchof |
| } | | | |

FIG. 2

|  | Bits | Bytes |  |
|---|---|---|---|
| DCM_structure(){ |  |  |  |
|     zero | 4 | 2 | bslbf |
|     first_virtual_channel | 12 |  | uimsbf range 0-4095 |
|     zero | 1 | 1 | bslbf |
|     DCM_data_length | 7 |  | uimsbf range 1-127 |
|     for(i=0;i<DCM_data_length;i++){ |  |  |  |
|         range_defined | 1 | (1) | bslbf{no,yes} |
|         channels_count | 7 |  | uimsbf range 1-127 |
|     } |  |  |  |
| } |  |  |  |

FIG. 3A

|  | Bits | Bytes |  |
|---|---|---|---|
| VCM_structure(){ |  |  |  |
|     zero | 2 | 1 | bslbf |
|     descriptors_included | 1 |  | bslbf{no,yes} |
|     zero | 5 |  | bslbf |
|     splice | 1 | 1 | bslbf{no,yes} |
|     zero | 7 |  | bslbf |
|     activation_time | 32 | 4 | uimsbf |
|     number_of_VC_records | 8 | 1 |  |
|     for(i=0;i<number_of_VC_records;i++){ |  |  |  |
|         virtual_channel() | * | (*) |  |
|     } |  |  |  |
| } |  |  |  |

FIG. 3B

|  | Bits | Bytes |  |
|---|---|---|---|
| virtual_channel(){ | | | |
|     zero | 4 | 2 | bslbf |
|     virtual_channel_number | 12 | | uimsbf range 0-4095 |
|     application_virtual_channel | 1 | 1 | bslbf{no,yes} |
|     zero | 1 | | bslbf |
|     path_select | 1 | | bslbf see Table 5.18 |
|     transport_type | 1 | | bslbf see Table 5.19 |
|     channel_type | 4 | | uimsbf see Table 5.20 |
|     if(application_virtual_channel) { | | | |
|         application_ID | 16 | (2) | |
|     } else { | | | |
|         source_ID | 16 | (2) | |
|     } | | | |
|     if(transport_type==MPEG-2) { | | | |
|         CDS_reference | 8 | ((1)) | uimsbf range 1-255 |
|         program_number | 16 | ((2)) | |
|         MMS_reference | 8 | ((1)) | uimsbf range 1-255 |
|     }else{/* non-MPEG-2*/ | | | |
|         CDS_reference | 8 | ((1)) | uimsbf range 0-255 |
|         scrambled | 1 | ((1)) | bslbf{no,yes} |
|         zero | 3 | | bslbf |
|         video_standard | 4 | | uimsbf see Table 5.21 |
|         zero | 16 | ((2)) | bslbf |
|     } | | | |
|     if(descriptors_included) { | | | |
|         descriptors_count | 8 | (1) | uimsbf |
|         for(i=0;i<descriptors_count;i++){ | | | |
|             descriptor() | (*) | ((*)) | |
|         } | | | |
|     } | | | |
| } | | | |

FIG. 4

APPARATUSES AND METHODS FOR RESOLVING CHANNEL INFORMATION INCONSISTENCIES

This application claims the benefit of the Korean Patent Application No. 10-2005-0048872, filed on Jun. 8, 2005, which is hereby incorporated by reference as if fully set forth herein.

BACKGROUND

1. Field of the Disclosure

The present disclosure relates to content broadcasting technology, and more particularly, to apparatuses and methods for resolving channel information inconsistencies.

2. Background

According to one aspect of the content broadcasting technology, a host such as a cable broadcast receiver may use a cable card or a Point-Of-Deployment (POD) module provided by a cable system operator. Alternatively, the cable broadcast receiver may have a built-in module that is a functional equivalent of the cable card. As such, the cable broadcast receiver, which could be an OpenCable Digital TV or a CableReady Digital TV, etc., may have a configuration that may or may not require a separate cable card. Where a cable card is required, the cable broadcast receiver may include a slot to receive the cable card. The cable card may use Personal Computer Memory Card International Association (PCMCIA) standard in order to interface with the cable broadcast receiver.

A cable broadcasting station transmits contents such as programs and channel information. The cable broadcasting station may be a cable system operator (SO) or a multiple system operator (MSO), which basically is a combination of several SOs.

The cable card inserted into the cable broadcast receiver or its equivalent receives Service Information (SI) delivered Out-Of-Band (OOB) from the cable broadcasting station. The SI information may include one or more tables that may be used by the cable broadcast receiver to create a channel map (or list). The channel map allows the cable broadcast receiver to use the channel settings set by the broadcast station. For example, an included table may be a Short-form Virtual Channel Table (SVCT). The SVCT may include a Virtual Channel Map (VCM) sub-table, a Defined Channel Map (DCM) sub-table, and an Inverse Channel Map (ICM) sub-table.

The VCM sub-table contains a virtual channel number and detailed information necessary to tune to that virtual channel number. The DCM sub-table contains all the virtual channel numbers of the cable channels that may be available to the cable broadcast receiver to be used by a user. The ICM sub-table contains the virtual channel numbers that may be mapped one-to-one to an identifier (ID) value corresponding to each channel. Usually, the DCM and VCM sub-tables are needed to configure the channel map, and the ICM sub-table is optional. In other words, the cable broadcast receiver may configure a channel map or list based on a proper combination of the received VCM and DCM sub-tables. There may be instances where the broadcasting station may transmit the VCM information and the DCM information which are inconsistent with each other. For example, the DCM information may contain channel 2 but the VCM information may not have information that defines channel 2, or vice versa. Also, the DCM information may contain channel 2, but there may be plural VCM information entries that may define channel 2 when there should be a one-to-one correspondence between the DCM information the VCM information.

Thus, when the broadcasting station transmits the DCM information and the VCM information that are inconsistent with each other, the cable broadcast receiver, which receives the information, may not be able to create a proper channel map or list. For example, a tunable channel may not exist in the channel map, or a specific channel may not work although the channel exists in the channel map.

SUMMARY

Accordingly, apparatuses and methods for resolving channel information inconsistencies are highly desirable.

For instance, it is desirable to have apparatuses and methods capable of resolving inconsistencies between the DCM information and the VCM information.

Advantages, objects, and features of the invention may be apparent in part in the description which follows and in part may become apparent to those having ordinary skill in the art upon examination of the following or may be learned from practice of the invention. The objectives and other advantages of the various embodiments of the invention may be realized and attained by the structures and processes described in the written description, in the claims, and in the appended drawings.

To achieve these objects and other advantages and in accordance with the purpose of the invention, as embodied and broadly described herein, a host comprises a controller configured to receive SI information, the controller further configured to retrieve DCM information and VCM information from the SI information, the controller further configured to resolve inconsistencies between the DCM information and the VCM information, and the controller further configured to create a resulting channel map that reflects the resolution of the inconsistencies between the DCM information and the VCM information.

In another aspect, a method comprises the steps of receiving SI information, retrieving DCM information and VCM information from the SI information, and resolving any inconsistency between the DCM information and the VCM information by creating a resulting channel map that reflects the resolution of the inconsistencies between the DCM information and the VCM information.

In another aspect, there is a processor executable medium having instructions contained therein, which when executed by a processor, causes the processor to perform a method comprising the steps of receiving SI information, retrieving DCM information and VCM information from the SI information, and resolving any inconsistency between the DCM information and the VCM information by creating a resulting channel map that reflects the resolution of the inconsistencies between the DCM information and the VCM information.

It is to be understood that both the foregoing general description and the following detailed description of the present invention are exemplary and explanatory and should not be construed as limiting the scope of the claims.

BRIEF DESCRIPTION OF THE DRAWINGS

The accompanying drawings, which are included to provide a further understanding of the disclosure, are incorporated herein and constitute a part of this application. The drawings together with the written description serve to explain one or more embodiment(s) of the invention. In the drawings.

DETAILED DESCRIPTION

Reference will now be made in detail to the preferred embodiments of the present invention, examples of which may be illustrated in the accompanying drawings. Wherever possible, the same reference numbers will be used throughout the drawings to refer to the same or like parts for simplicity.

Figure 1:
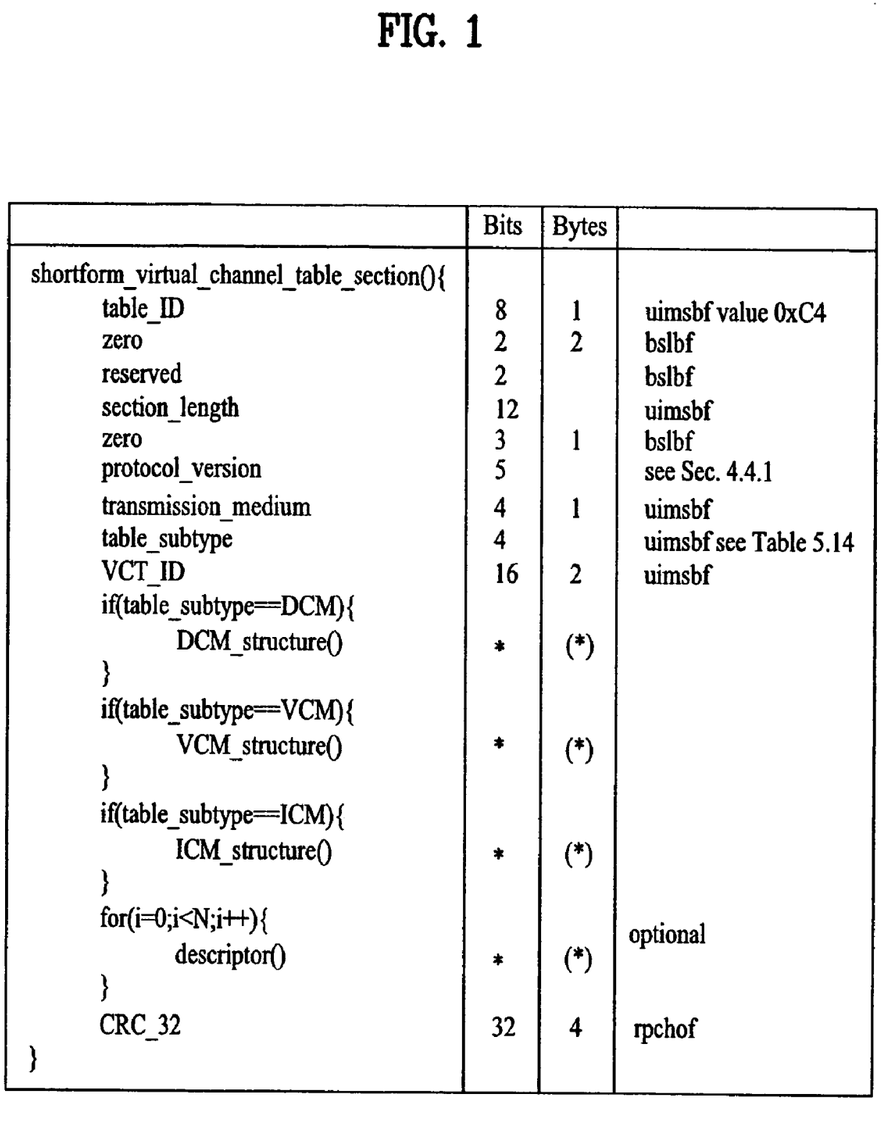
FIG. 1 illustrates an example of a sytax structure of SVCT table according to one embodiment of the present invention.

FIG. 1 illustrates an example of a syntax structure of a SVCT table according to one embodiment of the present invention, in which a table ID (table_ID) value has been set to 0xC4. A sub-table type (table_subtype) field may identify a sub-table type (e.g., a DCM sub-table, a VCM sub-table, and an ICM sub-table), which are being transmitted with the SVCT table.

Figure 2:
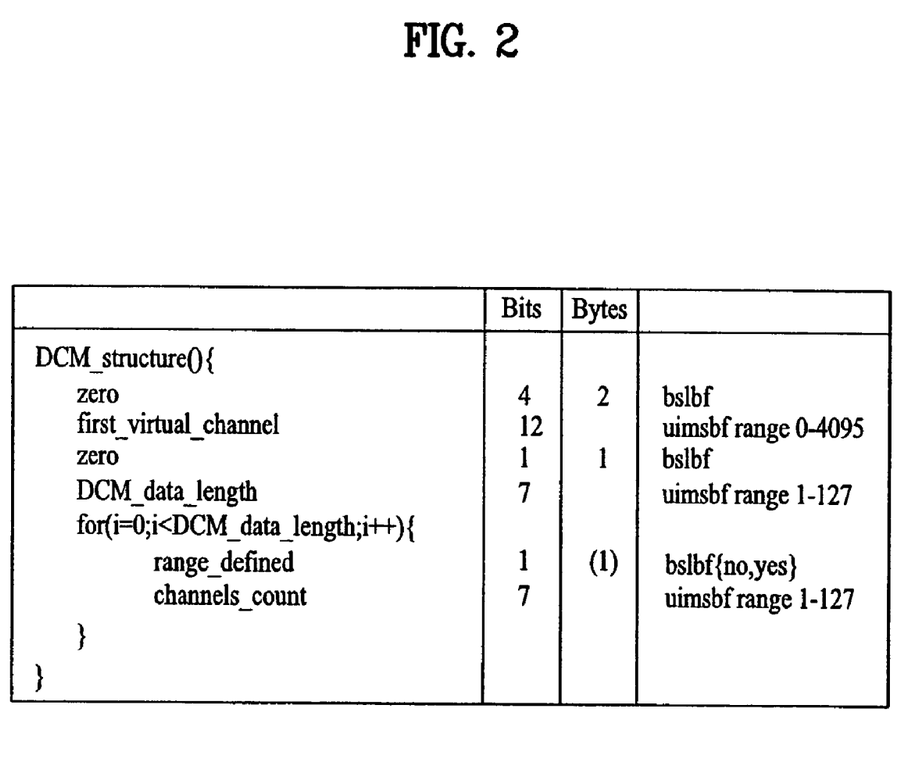
FIG. 2 illustrates an example of a syntax structure of DCM sub-table of FIG. 1.
Figure 3A:
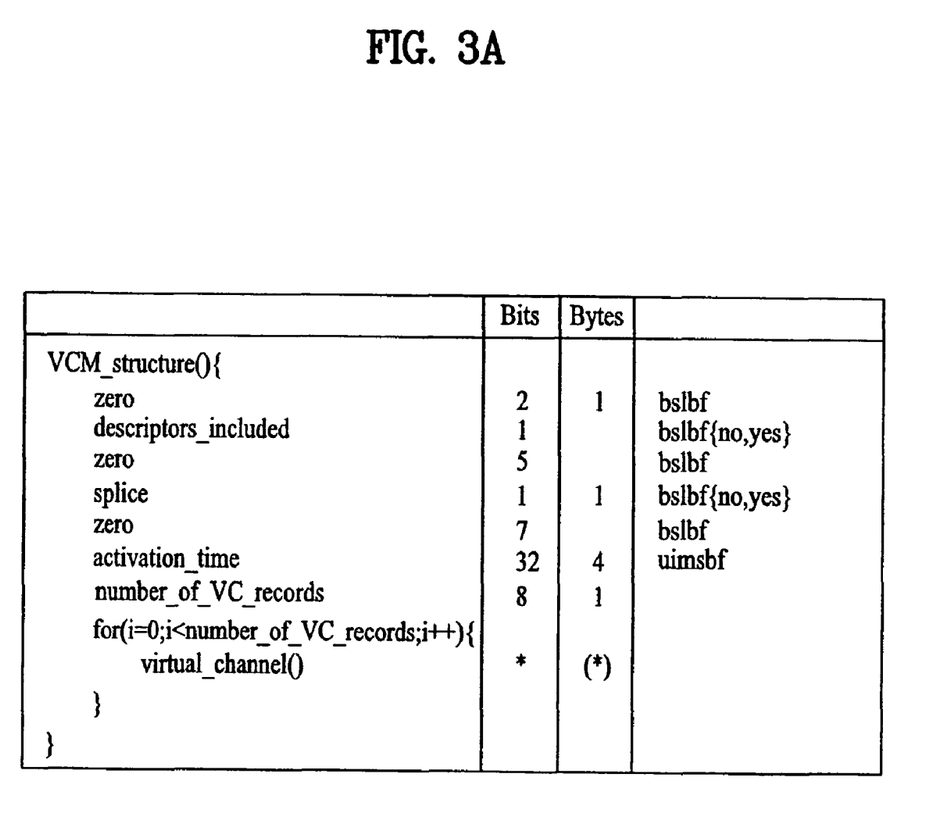
FIG. 3A illustrates an example of a syntax structure of VCM sub-table of FIG. 1.

When the sub-table type field identifies a DCM sub-table, a syntax structure of the DCM sub-table(DCM_structure( )) of FIG. 2 is retrieved. On the other hand, when the sub-table type field identifies a VCM sub-table, a syntax structure of the VCM sub-table (VCM_structure( )) of FIG. 3a is retrieved.

FIG. 2 illustrates an example of the syntax structure of DCM sub-table of FIG. 1. The DCM sub-table describes each of the virtual channel numbers for service channels. To this end, the DCM sub-table includes a first_virtual_channel field, a DCM_data_length field, a range_defined field, and a channels_count field.

The first_virtual_channel field contains a first virtual channel number (virtual_channel) which is provided by the SVCT table section.

The DCM_data_length field contains a number of DCM data fields following thereafter.

The range_defined field is a Boolean flag, which indicates whether channels of a group allocated by the channels_count field are defined in the SVCT table.

The channels_count field indicates the number of channels which are defined (or not defined) in a corresponding group. Each byte is analyzed accumulatively and initialized by the first_virtual_channel field value.

For example, assuming that channel numbers 2-90, 200-210, 400-410, 600-610, 800-810 and 999 are defined, and the first_virtual_channel field is '0.' The channels could be divided into 16 groups: 2, 89, 109, 11, 127, 62, 11, 127, 62, 11, 127, 62, 11, 127, 61, 1; and the DCM_data_length field value is 16. In this instance, the "for" loop is repeated 16 times.

The range_defined field value is set to 1 in the underline groups, 89, 11, 11, 11, 11, 1. The non-underlined groups indicate non-defined channel numbers between defined channel numbers, in which the range_defined field value is cleared as "0." If the channels_count field is allocated 7 bits, it can contain a maximum value of 127. If a value greater than 127 is to be stored in the channels_count field, then the value is divided based on groups.

FIG. 3A illustrates is an example of a syntax structure of VCM sub-table of FIG. 1. The VCM sub-table provides detailed information of each channel, such as channel number, channel type, particular ID of channel, channel frequency, whether the channel is scrambled, etc. In order to provide such information, the VCM sub-table includes a number_of_VC_records field, and a virtual_channel ( ) field as variables in a "for" loop.

The number_of_VC_records field indicates the number of virtual_channel ( ) records, i.e., the number of channels and associated detailed information. The "for" loop is repeatedly performed according to the value of the number_of_VC_records field.

Figure 3B:
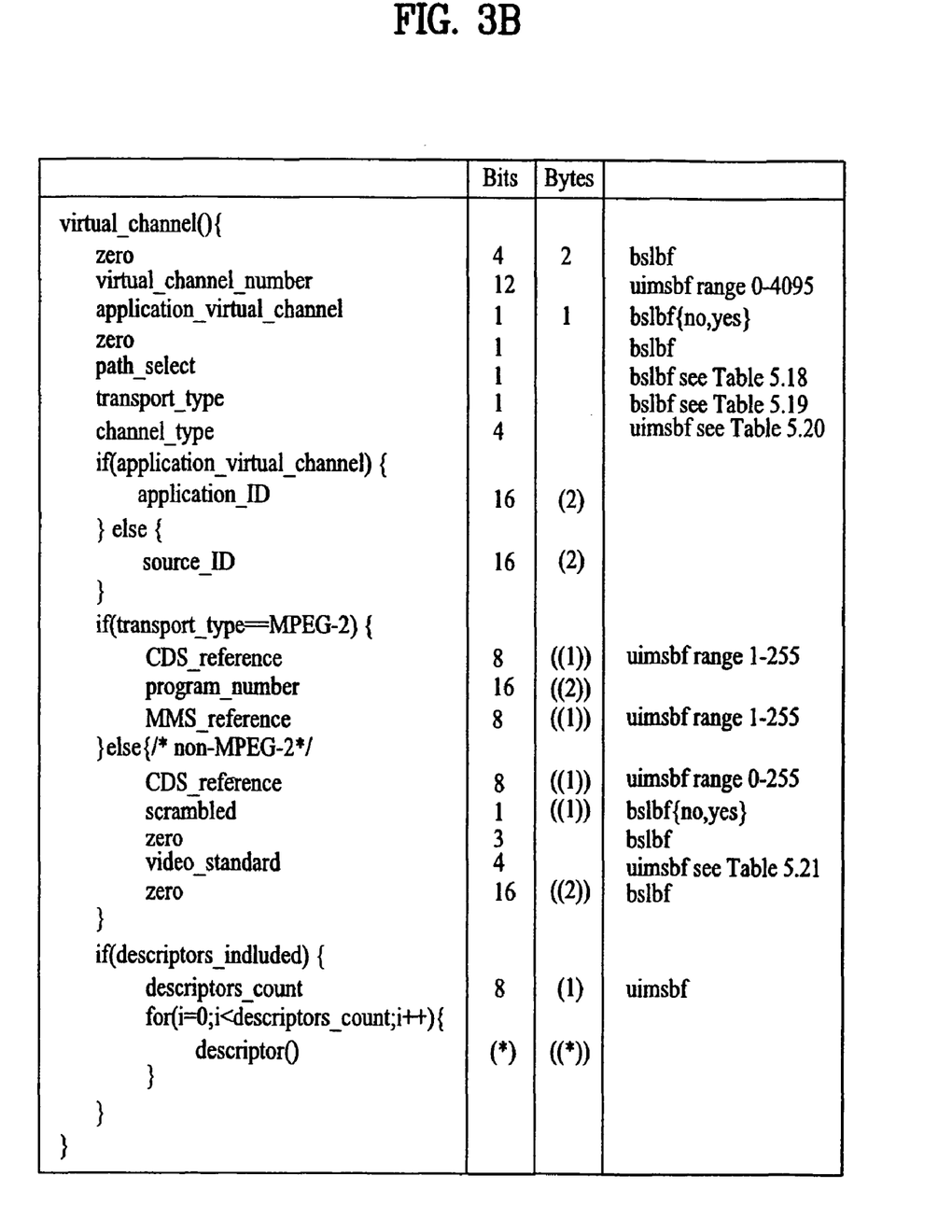
FIG. 3B illustrates an example of a syntax structure of virtual_channel( ) sub-table of FIG. 3A.

The virtual_channel( ) field contains detailed information of a virtual channel (virtual_channel_number), as shown in FIG. 3B, and includes fields, application_virtual_channel, transport_type, channel_type, source_ID, and program_number.

The application_virtual_channel field indicates whether a virtual channel is defined by an access pointer which is expressed by the application_ID or by an access pointer expressed by the source_ID.

The transport_type field indicates whether it is an MPEG-2 transport.

The channel_type field indicates whether it is a normal channel or a hidden channel.

The source_ID field indicates a programming source related to a virtual channel. Here, the indicated source is usually designated as one of video, text, data or audio programming. Each program source has a unique source_ID value.

When the transport_type field value indicates an MPEG-2, a CDS_reference field, a program_number field, and an MMS_reference field are included therein. On the other hand, when the transport_type field value does not indicate an MPEG-2, a CDS-reference field, a scrambled field, and a video_standard field are included therein.

The CDS_reference field describes a carrier frequency of a physical channel related to a corresponding virtual channel, where CDS is an acronym for carrier definition sub-table.

The MMS_reference field describes modulation information related to a corresponding virtual channel, where MMS is an acronym for modulation mode sub-table.

The program_number field indicates a virtual channel number in which services are defined, for example in a program association table (PAT) and a program map table (PMT).

Figure 4:
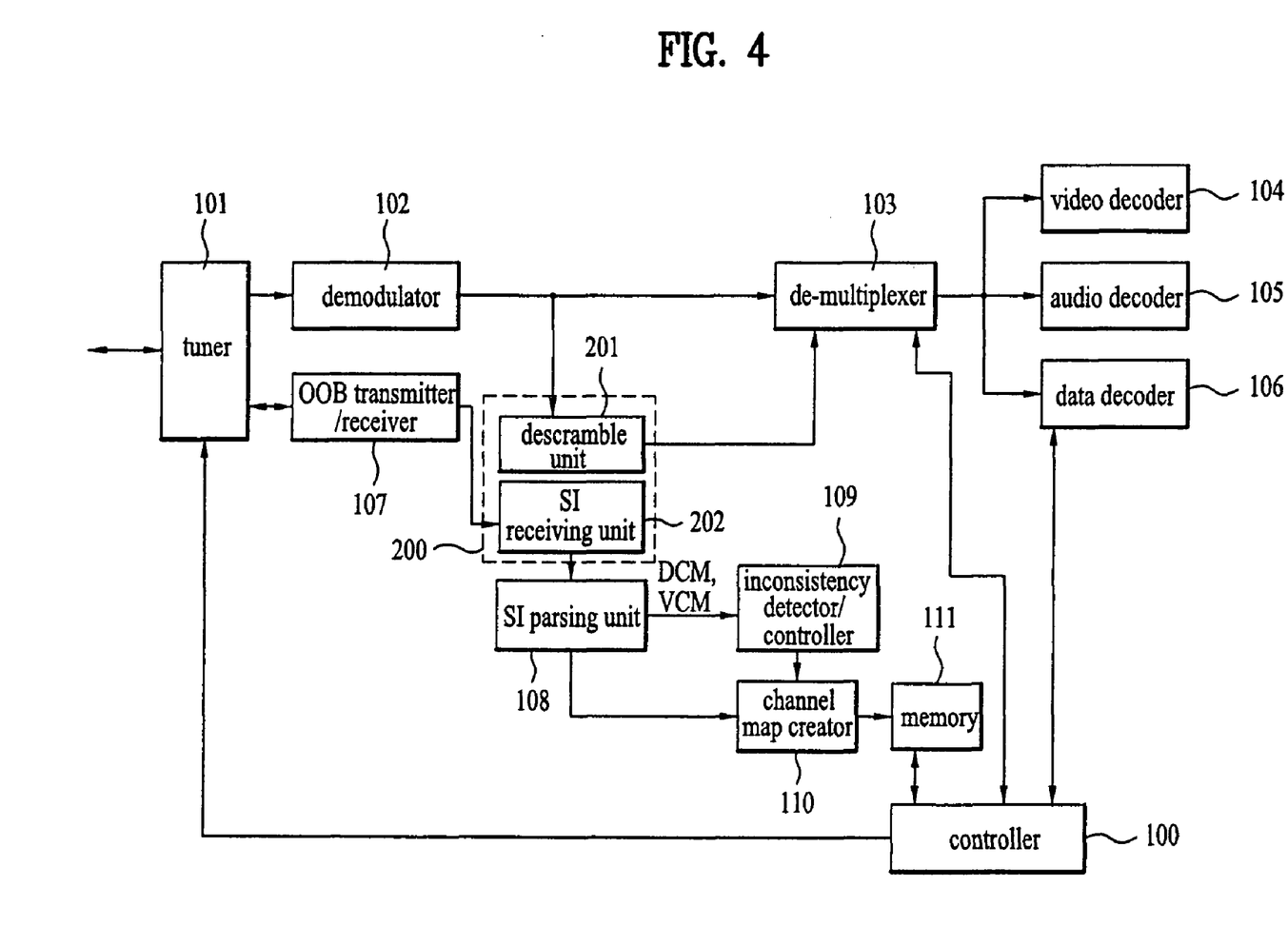
FIG. 4 is a block diagram of a broadcast receiver according to one embodiment of the present invention.

FIG. 4 is an exemplary block diagram of a host such as a broadcast receiver that is capable of receiving the SVCT tables and associated sub-tables described above according to one embodiment of the present invention. The broadcast receiver is configured to resolve inconsistencies between DCM information and VCM information. Here, the dashed lines representing block 200 could be a built-in component of the broadcast receiver or could be a cable card that could be separately installed in the broadcast receiver.

As shown in FIG. 4, the block 200 includes a descramble unit 201 and a SI parsing unit 202.

The broadcast receiver also includes a controller 100, a tuner 101, a demodulator 102, a demultiplexer 103, a video decoder 104, an audio decoder 105, a data decoder 106, an OOB transmitter/receiver 107, an SI parsing unit 108, an inconsistency detector/controller 109, a channel map creator 110, and a memory 111.

An operation of the broadcast receiver will now be described. The broadcast receiver receives an audio/video (A/V) broadcast program signal, which is transmitted in-band. A tuner 101 tunes and receives a selected portion of the A/V broadcast program signal, which is demodulated by a demodulator 102, and then forwarded to the descramble unit 201. The descramble unit 201 may determine whether the demodulated A/V broadcast program signal is scrambled. If the A/V broadcast program signal is not scrambled, the A/V broadcast program signal is forwarded to the multiplexer 103. Otherwise, if the A/V broadcast program signal is scrambled, then the descramble unit 201 may determine whether the scrambled A/V broadcast program signal has been approved for descrambling via a subscriber check, for example. If approved, the descramble unit 201 may descramble the A/V broadcast program signal. Thereafter, the descrambled A/V broadcast program signal is forwarded to the demultiplexer 103.

The demultiplexer 103 may demultiplex a video signal and an audio signal from the A/V broadcast program signal, which may be time multiplexed, based on control signals from the controller 100. The demultiplexed video and audio signals are forwarded to the video decoder 104 and the audio decoder 105, respectively.

The video signal is usually compressed and encoded. The video decoder 104 decodes the compressed and encoded video signal, thereby restoring the video signal to its original form. Similarly, the audio signal is usually compressed and encoded. The audio decoder 105 decodes the compressed and encoded audio signal, thereby restoring the audio signal to its original form. The video decoder 104 may be an MPEG-2 decoder, and the audio decoder 105 may be an AC-3 decoder.

When the broadcast receiver includes block 200, an Extended Channel is opened through an OOB band to the broadcast receiver through the block 200. Therefore, the block 200 may forward the SI information to the SI parsing unit 108 though the Extended Channel. The SI information transmitted through the OOB band is received by the OOB transmitter/receiver 107 through the tuner 101. The OOB transmitter/receiver 107 forwards the SI information to the SI receiving unit 202. The SI receiving unit 202, in turn, forwards the SI information to the SI parsing unit 108.

The SI information includes channel information (a frequency, a modulation method, whether there is a channel service, etc.) for all of the service channels. Also, the SI information further includes an Electronic Program Guide (EPG) for all of the service channels, and information which relates to channel brandings (i.e., channel names, channel numbers) of broadcasting companies, and access control for paid channels.

Specifically, the SI information includes tables and sub-tables for creating a channel map (or list) and EPG information of the channel map. The tables and sub-tables for creating a channel map may include CDS and MMS of the network information table (NIT), and the VCM and DCM of the SVCT table, etc.

The SI parsing unit 108 parses the SI information received from the SI receiving unit 202 to retrieve SVCT table including DCM and VCM information and forward them to the channel map creator 110. The DCM and VCM information in the SVCT table may also be forwarded to the inconsistency detector/controller 109.

The channel map creator 110 may create a channel map based at least in part on the resolutions of the inconsistency detector/controller 109. The channel map information created by the channel map creator 110 is stored in a memory 111.

Figure 5:
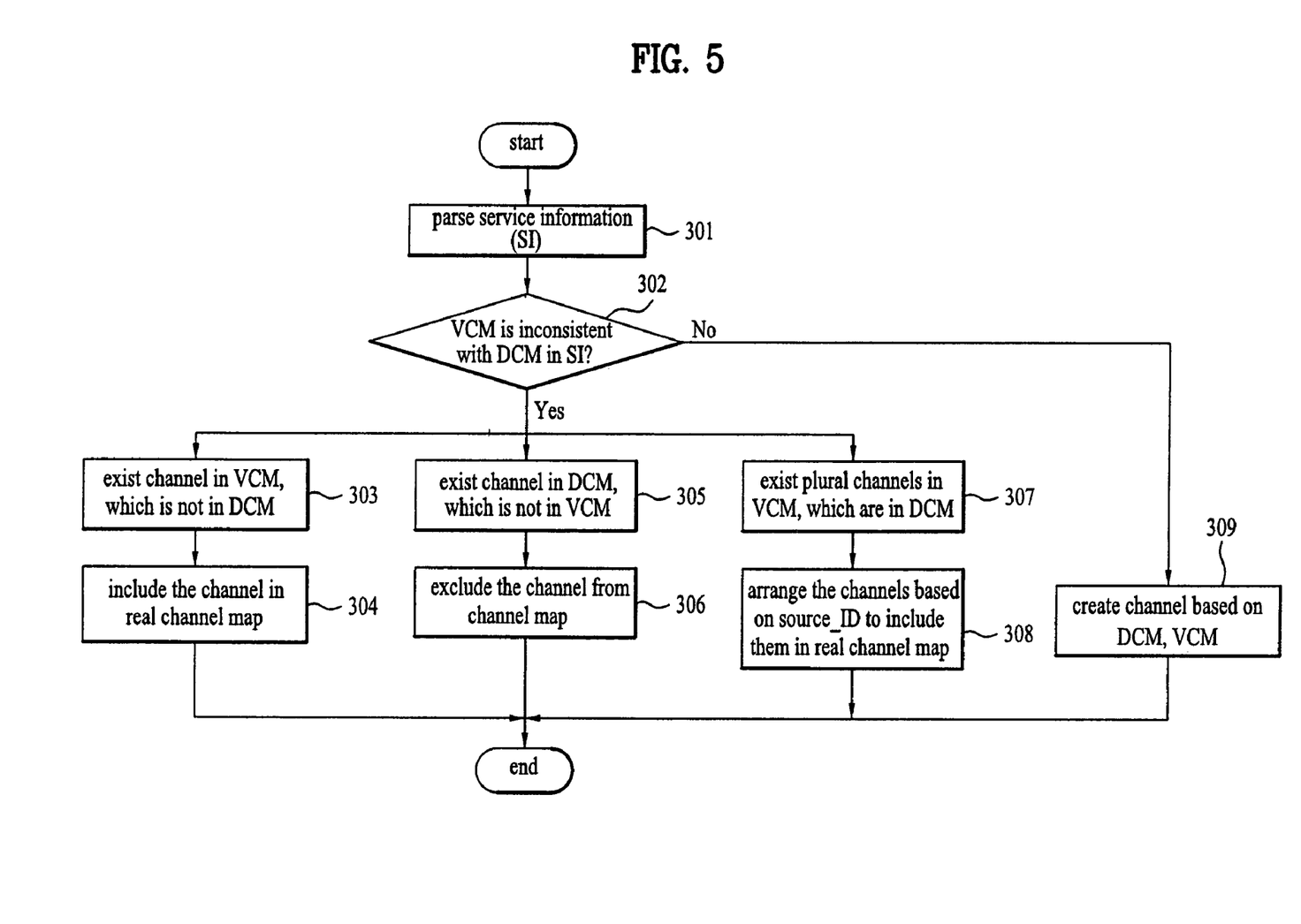
FIG. 5 illustrates an exemplary flow chart of a method for processing channel information to create a channel map according to one embodiment of the present invention.

FIG. 5 illustrates an exemplary flow chart of a method for resolving inconsistencies between DCM information and VCM information according to one embodiment of the present invention. For example, the method may be performed by the inconsistency detector/controller 109 and the channel map creator 110. An operation of the method is now described.

At step 301, SI information is parsed to retrieve DCM information and VCM information. The operation continues to step 302. At step 302, a determination is made whether there is an inconsistency between the DCM information and the VCM information. If there is an inconsistency, the operation may perform one of the available sub-processes based on the inconsistency.

If the inconsistency is where information defining the channel exists in the VCM information, but the channel does not exist in the DCM information, then the operation continues to step 303. Specifically, this type of consistency occurs when a channel number does not exist in the DCM information, but sufficient information defining the channel exists in the VCM information to tune to that channel. In this instance, the operation continues to step 304 where the channel is added to the channel map. As an example, if channel 11 does not exist in the DCM information but sufficient information defining channel 11 exists in the VCM information, then channel 11 can be tuned. Therefore, although channel 11 does not exist in the DCM information, it can be added to the channel map.

An advantage of adding the channel to the channel map rather than discarding it even though the channel number does not exist in the DCM information is that more channels may be available to the user.

If the inconsistency is where a channel number exists in the DCM information, but the information defining the channel does not exist in the VCM information, then the operation continues to step 305. Specifically, information defining the channel necessary to tune to that the channel does not exist even though a corresponding channel number exists in the DCM information. Thus, the channel cannot be used. In this instance, the operation continues to step 306 where the channel is excluded from the channel map. As an example, if channel 11 exists in the DCM information but the information defining channel 11 does not exist in the VCM information, then the channel cannot be tuned. Therefore, channel 11 is excluded from the channel map.

If the inconsistency is for a channel number that exists in the DCM information, and there are a plurality of VCM information entries corresponding to that channel, then operation continues to step 307. Specifically, this type of inconsistency occurs because there should be a one-to-one correspondence between a channel number and information defining the channel. However, where several VCM information entries exist for a channel number in the DCM information, problems can occur in that, for example, channel frequencies may be different for the various VCM information entries, but the channel numbers are identical for those VCM information. In this instance, the operation continues to step 308. At step 308, if the channel number already exists in the channel map then a unique source_ID field value of the retrieved VCM information entry and a unique source_ID field value of the VCM information associated with the channel map are compared. If the unique source_ID field value is different than that of the unique source_ID field value in the channel map, the channel number and/or with the VCM information is added to the channel map as a new entry. If the unique source_ID field values are identical, then the retrieved VCM information is disregarded and the channel map is maintained.

Where a new entry is added to the channel map, two identical channel numbers may exist having different VCM information. Otherwise one channel number with different VCM information entries may exist. In this instance, because the VCM information entries have different unique source_ID field, the channels may be arranged according to the source_ID field value. As an example, when a user switches to that channel number, the VCM information entry having the smallest unique source_ID field value is used to tune to that channel. Alternatively, the channel may be tuned using the VCM information having the largest unique source_ID field value. Otherwise, the channel may be tuned based on a preset sequence from among the plurality of the VCM information.

It should be appreciated that the kinds of consistency described above are merely exemplary and should not be construed as an exhaustive list.

Otherwise, at step 302, if there is a one-to-one correspondence between the DCM information and the VCM information, the channel is created in the channel map based on the DCM information and the VCM information.

The present disclosure can be applied to cable broadcast receivers, such as a CableReady Digital TV, etc., in which the cable broadcast receivers have terrestrial analog/digital channels, and cable analog/digital channels. With proper modifications, the present disclosure may be implemented in any terrestrial and satellite systems.

It will be appreciated that, in various of the above-disclosed and other features and functions, or alternatives thereof, they may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow process or data structure can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

As disclosed above, the broadcast receiver and a method for resolving channel information can be performed such that: when a channel, which does not exist in the DCM information, exists in the VCM information, the channel is included in a channel map. When a channel, which does not exist in the VCM information, exists in the DCM information, the channel is not included in the channel map. When a channel, which exists in the DCM information, exists in a plurality of VCM information entries, the channel is arranged on the basis of values of the source_ID fields.

Therefore, the malfunctions of the broadcast receiver, which may be caused by inconsistency between the DCM channel information and VCM channel information, may be minimized.

It will be appreciated that various of the above-disclosed and other features and functions, or alternatives thereof, may be desirably combined into many other different devices or applications also, various presently unforeseen or unanticipated alternatives, modifications, variations or improvements therein may be subsequently made by those skilled in the art, and are also intended to be encompassed by the following claims.

What is claimed is:

1. A host comprising:
   a controller configured to receive service information (SI), the controller further configured to retrieve defined channel map (DCM) information and virtual channel map (VCM) information from the SI information,
   resolve inconsistencies between the DCM information and the VCM information by creating a resulting channel map that comprises channel information that is defined by the DCM information and the VCM information, wherein when a plurality of VCM information entries corresponds to a single DCM information entry then inconsistencies between the DCM information and the VCM information are resolved by comparing values associated with each of a plurality of VCM information entries, and creating a resulting channel map to include channel information that is defined by the DCM information entry and defined by at least two of the plurality of the VCM information entries when any value associated with each of the plurality of the VCM information entries is different.

2. The host as set forth in claim 1, wherein the controller is configured to create the resulting channel map to exclude channel information when the channel information is defined by a DCM information entry and not defined by a VCM information entry.

3. The host as set forth in claim 1, wherein the controller is configured to create the resulting channel map to include channel information when the channel information is not defined by a DCM information entry and defined by a VCM information entry.

4. The host as set forth in claim 1, wherein if the controller determines that the values associated with each of the plurality of VCM information entries are identical, then the controller is further configured to resolve the inconsistencies such that the resulting channel map includes channel information that is defined by the DCM information entry and defined by one of the plurality of VCM information entries.

5. The host as set forth in claim 1, wherein the host receives the SI information from a cable card.

6. A method comprising the steps of:
   receiving service information (SI);
   retrieving defined channel map (DCM) information and virtual channel map (VCM) information from the SI information; and
   resolving any inconsistency between the DCM information and the VCM information by creating a resulting channel map that reflects the resolution of the inconsistencies between the DCM information and the VCM information by creating a resulting channel map that comprises channel information that is defined by the DCM information and the VCM information, wherein a value associated with each of a plurality of VCM information entries are compared when a plurality of VCM information entries corresponds to a single DCM information entry, and creating the resulting channel map to include channel information that is defined by the DCM information entry and defined by at least two of the plurality of the VCM information entries when any value associated with each of the plurality of VCM information entries is different.

7. The method as set forth in claim 6, wherein the resulting channel map excludes channel information when the channel information is defined by the DCM information entry and not defined by the VCM information entry.

8. The method as set forth in claim 6, wherein the resulting channel map includes channel information when the channel information is not defined by the DCM information entry and defined by the VCM information entry.

9. The method as set forth in claim 6, wherein if the values associated with each of the plurality of VCM information entries are identical, then the resulting channel map includes channel information that is defined by the DCM information entry and defined by one of the plurality of the VCM information entries.

10. A processor executable medium having instructions contained therein, which when executed by a processor, causes the processor to perform a method comprising the steps of:
- receiving service information (SI);
- retrieving defined channel map (DCM) information and virtual channel map (VCM) information from the SI information; and
- resolving any inconsistency between the DCM information and the VCM information by creating a resulting channel map that reflects the resolution of the inconsistencies between the DCM information and the VCM information by creating a resulting channel map that comprises channel information that is defined by the DCM information and the VCM information, wherein a value associated with each of a plurality of VCM information entries are compared when a plurality of VCM information entries corresponds to a single DCM information entry, and creating the resulting channel map to include channel information that is defined by the DCM information entry and defined by at least two of the plurality of the VCM information entries when any value associated with each of the plurality of VCM information entries is different.

11. The processor executable medium as set forth in claim 10, wherein the resulting channel map excludes channel information when the channel information is defined by the DCM information entry and not defined by the VCM information entry.

12. The processor executable medium as set forth in claim 10, wherein the resulting channel map includes channel information when the channel information is not defined by the DCM information entry and defined by the VCM information entry.

13. The processor executable medium as set forth in claim 10, wherein if the values associated with each of the plurality of VCM information entries are identical, then the resulting channel map includes channel information that is defined by the DCM information entry and defined by one of the plurality of VCM information entries.

14. A method for resolving inconsistencies between defined channel map entries and virtual channel map entries received by a broadcast receiver, the method comprising the steps of:
- receiving service information (SI) that includes defined channel map (DCM) information and virtual channel map (VCM) information;
- retrieving DCM information and VCM information from the SI information; and
- resolving inconsistencies between the retrieved DCM information and the retrieved VCM information by comparing corresponding channel information defined in both a retrieved DCM information entry and a retrieved VCM information entry and creating a resulting channel map that is stored in the broadcast receiver, wherein the resulting channel map excludes channel information when the channel information is defined by the retrieved DCM information entry and not defined by the retrieved VCM information entry.

15. A method for resolving inconsistencies between defined channel map entries and virtual channel map entries received by a broadcast receiver, the method comprising the steps of:
- receiving service information (SI) that includes defined channel map (DCM) information and virtual channel map (VCM) information;
- retrieving DCM information and VCM information from the SI information; and
- resolving inconsistencies between the retrieved DCM information and the retrieved VCM information by comparing corresponding channel information defined in both a retrieved DCM information entry and a retrieved VCM information entry and creating a resulting channel map that is stored in the broadcast receiver, wherein the resulting channel map includes channel information when the channel information is not defined by the retrieved DCM information entry and defined by the retrieved VCM information entry.

16. A method for resolving inconsistencies between defined channel map entries and virtual channel map entries received by a broadcast receiver, the method comprising the steps of:
- receiving service information (SI) that includes defined channel map (DCM) information and virtual channel map (VCM) information;
- retrieving DCM information and VCM information from the SI information;
- resolving inconsistencies between the retrieved DCM information and the retrieved VCM information by comparing corresponding channel information defined in both a retrieved DCM information entry and a retrieved VCM information entry and creating a resulting channel map that is stored in the broadcast receiver, wherein a source value for the retrieved VCM information entry and a source value of the VCM information entry associated with the resulting channel map are compared when a plurality of retrieved VCM information entries corresponds to a single retrieved DCM information entry, and creating the resulting channel map to include the retrieved VCM information entry when the source value of the retrieved VCM information entry and the source value of the VCM information entry associated with the resulting channel map are different.

* * * * *